Figure 1:
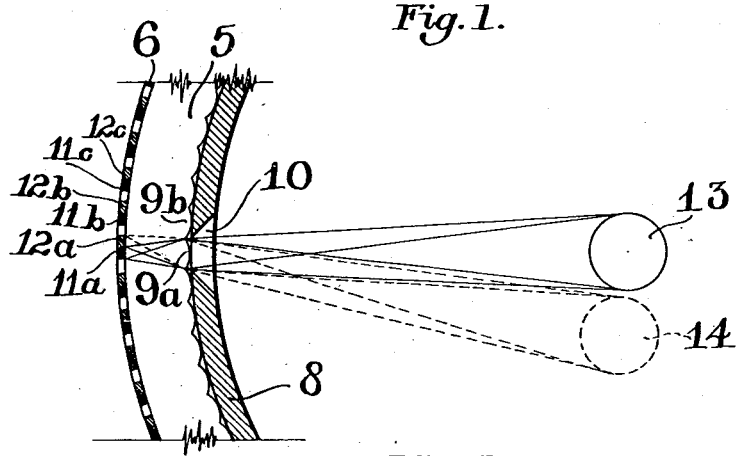

Aug. 7, 1934.  J. G. CAPSTAFF  1,969,451
SOUND REPRODUCTION
Filed March 5, 1930  2 Sheets-Sheet 1

Inventor
John G. Capstaff.

Attorney

Aug. 7, 1934.  J. G. CAPSTAFF  1,969,451
SOUND REPRODUCTION
Filed March 5, 1930  2 Sheets-Sheet 2
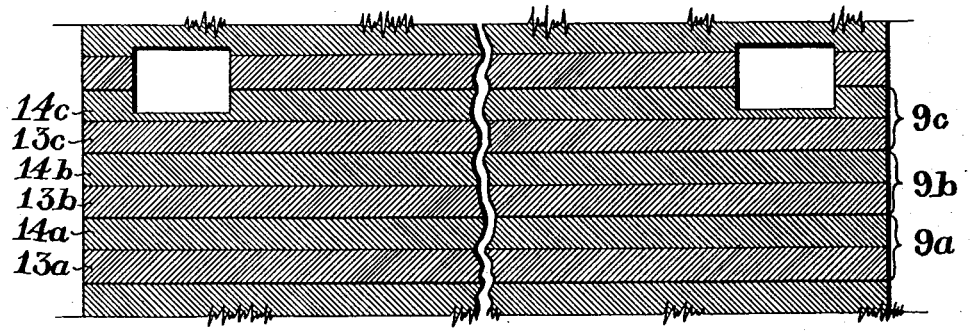
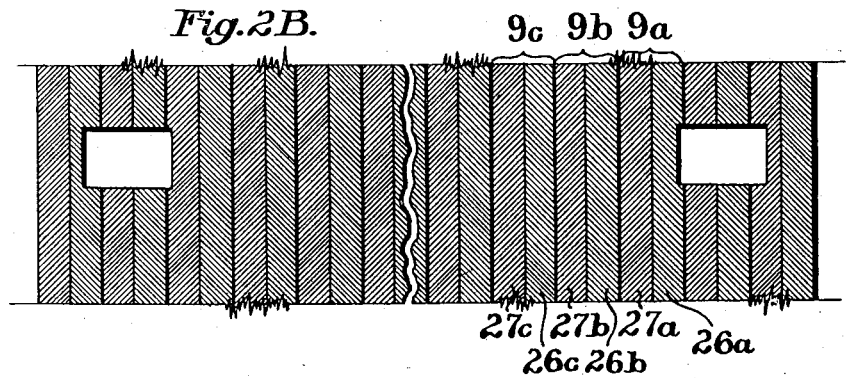
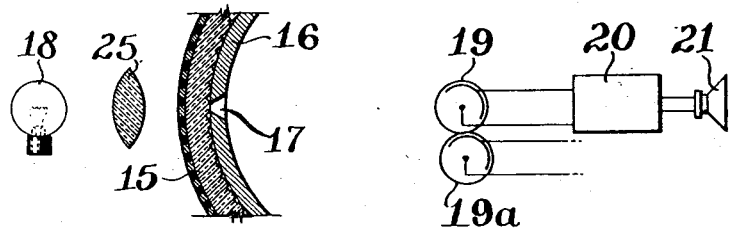
Inventor
John G. Capstaff.

Patented Aug. 7, 1934

1,969,451

UNITED STATES PATENT OFFICE 1,969,451

SOUND REPRODUCTION

John G. Capstaff, Rochester, N. Y., assignor to Eastman Kodak Company, Rochester, N. Y., a corporation of New York Application March 5, 1930, Serial No. 433,283

2 Claims. (Cl. 88—16.2)

This invention relates to photography and more particularly to the method of recording and reproducing sound from photographic records.

At the present time there are two methods in common use for recording sound on photographic films, in one of which the record is of constant width but of varying density and in the other of which, the record is of constant density but of varying width. In each of these methods of making records, it is necessary to reserve a portion of the film for the sound record, in the form of a continuous strip extending longitudinally of the film, commonly known as the "sound track." If either of these methods referred to, were used to record sound on a lenticulated film such as is used in color photography, it has been necessary to provide a plain surface on such film for the recording of sound thereon.

In accordance with the present invention it is proposed to record sound on any desired portion of the lenticulated film without the necessity of providing a portion thereof with a plain surface. The main feature of the invention, therefore, resides in the use of lenticulated film for the recording and reproduction of sound. A further feature of the invention resides in recording sound on discontinuous areas of a sound record in such a way that the sound may be reproduced in the same manner as from a continuous sound record. An additional feature of the invention includes the method of interspersing portions of the sound record with portions of the picture record in such a way that the picture record may be intermittently projected as a motion picture and the sound record may be reproduced without interruption. Still another feature of the invention includes recording on a film two different sound records similarly arranged longitudinally of said film strip but with portions of the two records intermingled, and selectively reproducing the portions of a desired one of said sound records without interruption.

That two or more distinct photographic records may be formed in interspersed relation on the same area of a lenticulated film will be readily apparent from a consideration of the well-known manner in which such film is utilized in the taking and projecting of color motion pictures. In this well-known three color process, color separation images are formed in interspersed relation on the film by utilizing one portion of the field behind each lens element for the image corresponding to one color and two other portions of the field for images corresponding to two other colors. In accordance with the present invention, one portion of the field behind each lens element is utilized for a sound record and the remaining portion of the field for a picture record or a second sound record.

Figure 2:
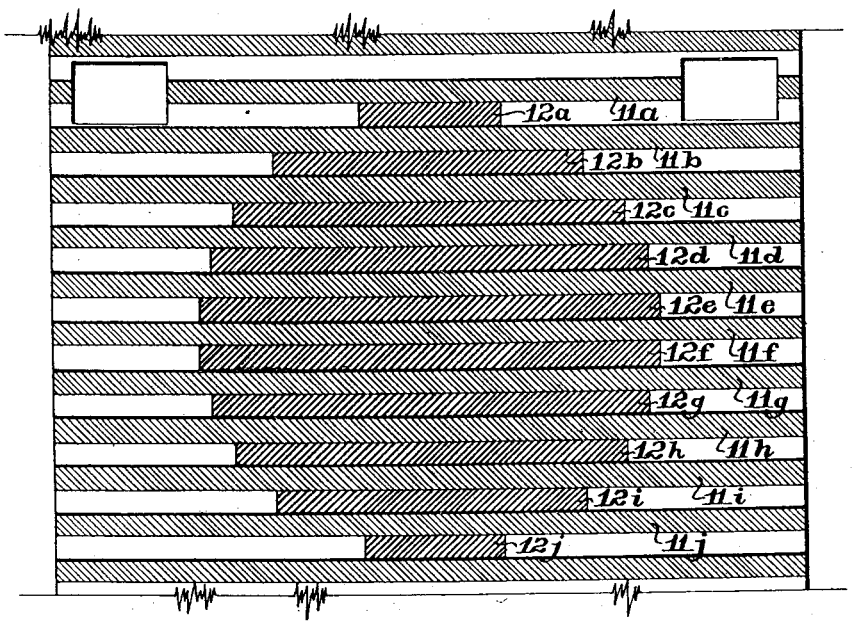

Other features will appear from the detailed description and claims when taken with the drawings in which Fig. 1 diagrammatically represents one method of making a sound record in accordance with the present invention wherein the film is shown in elevation; Fig. 2 is a plan view of a greatly enlarged fragment of film with the cylindrical elements transverse to the edge thereof, showing portions of the sound record intermingled with portions of the picture; Fig. 2A is a similar enlarged view of a part of a strip of film showing portions of two sound records intermingled; Fig. 2B is a plan view of an enlarged fragment of film in which the cylindrical lens elements have their axes parallel to the edges of the film strip; Fig. 3 diagrammatically represents one method of reproducing a sound record in accordance with the present invention.

In Fig. 1, 5 designates a film support having a sensitized layer 6 on one surface and having its other surface embossed with cylindrical lens elements $9a$, $9b$, etc. whose axes of curvature are perpendicular to the plane of the paper and extend transversely on the film. Although cylindrical lens elements are referred to, any other lenticulated film such as disclosed in the patent to Berthon 992,151 may be used. In making a sound record on such lenticulated film, the film is moved about a curved support 8 having a slit 10 of a width equal to one lens element. A source of light 13 varying in accordance with the sound being recorded, is placed at the center of curvature of the support 8 so that each lens element forms an image of the light source on the sensitized layer 6. This varying light source may be such as is used to produce either variable density or variable area sound records. As the film travels past slit 10 with a continuous motion, one lens element $9a$ passes out of view at one edge of the slit while another lens element $9b$ comes into view at the same rate. If as assumed, the film travels in an arc, the center of curvature of which is at the light source 13, the images through the lens elements are displaced on the film as it moves past the slit. The lens elements $9a$, $9b$ and $9c$ record the sound on sections $11a$, $11b$, $11c$, etc. respectively of the film while the portions of the picture are recorded on sections $12a$, $12b$, $12c$, etc. respectively. It is to be understood that the size of the light source 13 is such that it occupies only a portion of the object field of the lens elements 9a and 9b, and therefore the image of the light on the sensitive layer 6 will occupy only the portion of the field of the lens element 9a represented by the section 11a. Also, the picture or object to be recorded is limited to the remaining portion of the object field of the lens elements 9a and 9b so that the picture image on the sensitive layer 6 will occupy the portion of the field of the lens element 9a not occupied by the sound record. The same procedure is followed when a second sound record is made instead of a picture record. In Fig. 2 the picture represented is a solid black circular disc from which it will be seen that the picture is discontinuous and has interminged therewith parts of the sound record. As pointed out above, the discontinuous picture image occupies a portion only if the image field of each lens element and all that is necessary to restrict the picture image to this portion is to mask the portion of the object field of the photographic objective which has been or is to be utilized for forming the sound record. This masking may be accomplished in any convenient manner as will readily be apparent to those skilled in the art, one suitable arrangement being illustrated in French Patent #521,533. Ordinarily the pictures will be taken and reproduced in the usual intermittent camera and projector but with their object fields partially masked; and the sound will be recorded and reproduced at a separate point and with the film moving continuously after the manner disclosed by Ries in Patent #1,473,976, issued November 13, 1923. It is, however, obvious that the sound and picture records may be produced on separate films and then printed on a single film or any other well known procedure may be followed. Cameras and projectors suitable for taking and reproducing pictures on lenticular film are well known and since the practice of my invention does not require the use of any particular apparatus, none has been illustrated. Instead of having portions of the sound record intermingled with portions of the picture, two sound records may be intermingled as represented in Fig. 2A wherein portions 13a, 13b, 13c, etc. represent one sound record and portions 14a, 14b, 14c, etc. represent a second sound record. It will thus be seen that the sound record is discontinuous lengthwise of the film so that the second sound record may be recorded on sections 14a, 14b, 14c, etc. This may be effected by placing a second light source varying in accordance with the sound being recorded at the point 14 (Fig. 1). Thus one or more sound records may be interspersed in the frames of the motion picture longitudinally of the film. In Figs. 2 and 2A the cylindrical lens elements which have their axes at right angles to the edges of the film strip are each represented by the area between the heavy horizontal lines. With the film strip represented in Fig. 2B, where the lens elements are shown with their axes extending parallel to the edges of the film strip one portion of the sound record may be recorded on the areas 26a, 26b, 26c, etc. and another sound record may be recorded on the portions 27a, 27b, 27c, etc. of the film.

When a negative has been made according to the method of Fig. 1, a positive film 15 is made therefrom either by reversal or projection printing. In reproducing such a positive record the film 15 is then passed continuously behind support 16 having a slit therein 17 illuminated by a light source 18 and condenser lens 25. An image of the light source will then be formed on the photoelectric cell or radiation responsive device 19 which is placed at the center of curvature of the support. This image thus formed will be of constant brightness since although the lens elements pass behind the slit in turn, each lens is uncovered at the same rate as the preceding one is obscured and the images from the sound are superimposed. Since the original light source 13 fluctuates in intensity at a frequency corresponding to certain sound vibrations, the images on the negative film will vary in density along the film although each single image will be a uniform image of the light source. The positive film 15 when passed behind the slit as just described will therefore project an image of the light source that will fluctuate in the same manner as the original light source. The photoelectric cell or other similar device 19 placed at the center of curvature of the support 16 converts these fluctuations in intensity of light developed by the record portions 11a, 11b, 11c, etc. into electric impulses which in turn may be amplified by an amplifier 20 and translated into sound by a loud speaker 21. It will be understood that if the record of Fig. 2A including the portions 13a, 13b, 13c, etc. is to be reproduced the photoelectric cell or other similar device 19 is placed at the center of curvature of the support 16 whereas if the record including 14a, 14b, 14c, etc. is to be reproduced this photoelectric cell or other similar device is moved to position 19a which corresponds to the position of the varying light when this record was made. In other words, when light is passed through the film in the opposite direction to which the exposure was made, the lens elements will image the photographic record in a plane corresponding to the former object field of the lens elements and the various portions of this image will exactly correspond to the portions of the object field during exposure. From this it will be seen that the light in the portion of this image corresponding to the portion of the object field occupied by the light source 13 during recording, will vary in accordance with the variations in the recording light. Obviously, the other portions of this image correspond to whatever appeared in the object field when the film was exposed, and the events which happened in various portions of the object field during exposure will be reproduced in this image in their original relation and any desired group of events may be selectively reproduced. When the film strip of Fig. 2B is reproduced, it is passed through a reproducing device similar to that indicated in Fig. 3 except that the support instead of being curved is a plane surface. The horizontal position of the photoelectric cell 19 instead of its vertical position as in the case of Figs. 2 and 2A determines which of the two sound records are to be reproduced. The successful functioning of this method of reproducing sound, requires that the frequency with which the lens elements pass the slit be higher than the frequency of the sound reproduced. If the frequency of the sound and the lens elements are the same, no reproduction whatever will be obtained. The lower the frequency of the sound the better it will be reproduced.

The present disclosure is merely typical of the many variations in and applications of the inventive idea, and the present invention is not to be limited thereby except as specifically defined in the following claims.

What I claim is:

1. An article of manufacture comprising a film having one surface embossed to form lenses and having on its other surface photographic sound records in superimposed relation to said lenses, portions of one sound record being interspersed with portions of the other sound record.

2. An article of manufacture comprising a film having one surface embossed to form lenses and having its other surface provided with pictures and a sound record, portions of said sound record being interspersed with portions of said pictures.

JOHN G. CAPSTAFF.